(12) United States Patent
Yamazaki

(10) Patent No.: US 12,597,235 B2
(45) Date of Patent: Apr. 7, 2026

(54) INFORMATION PROCESSING APPARATUS, LEARNING METHOD, RECOGNITION METHOD, AND NON-TRANSITORY COMPUTER READABLE MEDIUM

(71) Applicants: CANON KABUSHIKI KAISHA, Tokyo (JP); CANON MEDICAL SYSTEMS CORPORATION, Tochigi (JP)

(72) Inventor: Fukashi Yamazaki, Kanagawa (JP)

(73) Assignees: CANON KABUSHIKI KAISHA, Tokyo (JP); CANON MEDICAL SYSTEMS CORPORATION, Tochigi (JP)

( * ) Notice: Subject to any disclaimer, the term of this patent is extended or adjusted under 35 U.S.C. 154(b) by 503 days.

(21) Appl. No.: 18/178,589

(22) Filed: Mar. 6, 2023

(65) Prior Publication Data

US 2023/0290119 A1     Sep. 14, 2023

(30) Foreign Application Priority Data

Mar. 9, 2022     (JP) .................................. 2022-035944

(51) Int. Cl.
*G06V 10/764* (2022.01)

(52) U.S. Cl.
CPC .................................. *G06V 10/764* (2022.01)

(58) Field of Classification Search
CPC .................................................. G06V 10/764
See application file for complete search history.

(56) References Cited

U.S. PATENT DOCUMENTS

| | | | |
|---|---|---|---|
| 10,902,291 B1* | 1/2021 | Kim ........................ | G06N 3/045 |
| 11,094,082 B2 | 8/2021 | Yamazaki et al. | |
| 2012/0087556 A1* | 4/2012 | Dai ...................... | G06V 20/698 |
| | | | 382/128 |

(Continued)

FOREIGN PATENT DOCUMENTS

| | | | | |
|---|---|---|---|---|
| DE | 102021129544 A1 * | 9/2022 | ............... | G06N 3/08 |
| WO | 2021/045507 A2 | 3/2021 | | |

OTHER PUBLICATIONS

Liu, F. et al., "FusionNet: Incorporating Shape and Texture for Abnormality Detection in 3D Abdominal CT Scans" arXiv: 1908. 07654 [cs.CV] (Aug. 2019), pp. 1-8.

(Continued)

*Primary Examiner* — Pinalben Patel
(74) *Attorney, Agent, or Firm* — Carter, DeLuca & Farrell LLP

(57) ABSTRACT

An information processing apparatus includes at least one memory storing a program, and at least one processor which, by executing the program, causes the information processing apparatus to acquire learning image data, ground truth region image data which indicates a ground truth region of the first region included in the learning image data, and ground truth data on the recognition, acquire estimated region image data which indicates an estimated region of the first region in the learning image data, and train the learning model using a first training dataset constituted of the learning image data, the ground truth region image data and the ground truth data, and a second training dataset constituted of the learning image data, the estimated region image data and the ground truth data.

16 Claims, 8 Drawing Sheets

(56) References Cited

U.S. PATENT DOCUMENTS

| | | | |
|---|---|---|---|
| 2020/0051278 A1* | 2/2020 | Yamazaki | ............. G06V 20/10 |
| 2020/0058126 A1 | 2/2020 | Wang | |
| 2021/0201077 A1* | 7/2021 | Lwowski | ............ G06V 10/776 |
| 2022/0156520 A1* | 5/2022 | Brower | .................... G06N 3/09 |
| 2023/0377095 A1* | 11/2023 | Xiang | ................. G06T 3/4076 |

OTHER PUBLICATIONS

Notice of Reasons for Refusal issued by the Japanese Patent Office on Oct. 28, 2025 in corresponding JP Patent Application No. 2022-035944, with English translation.

* cited by examiner

FIG. 3

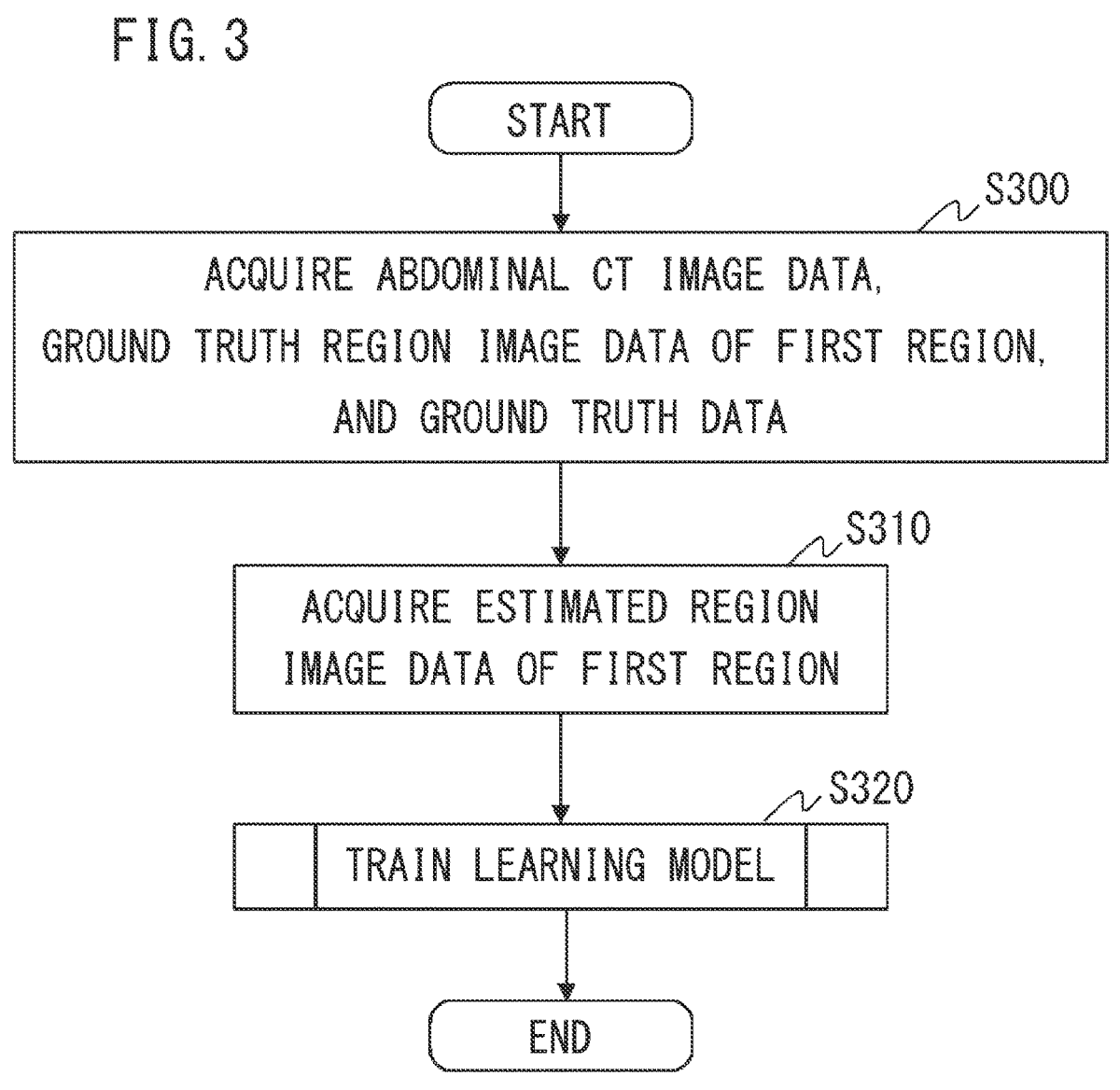

START

↓

ACQUIRE ABDOMINAL CT IMAGE DATA,
GROUND TRUTH REGION IMAGE DATA OF FIRST REGION,
AND GROUND TRUTH DATA ⟋S300

↓

ACQUIRE ESTIMATED REGION
IMAGE DATA OF FIRST REGION ⟋S310

↓

TRAIN LEARNING MODEL ⟋S320

↓

END

FIG. 8

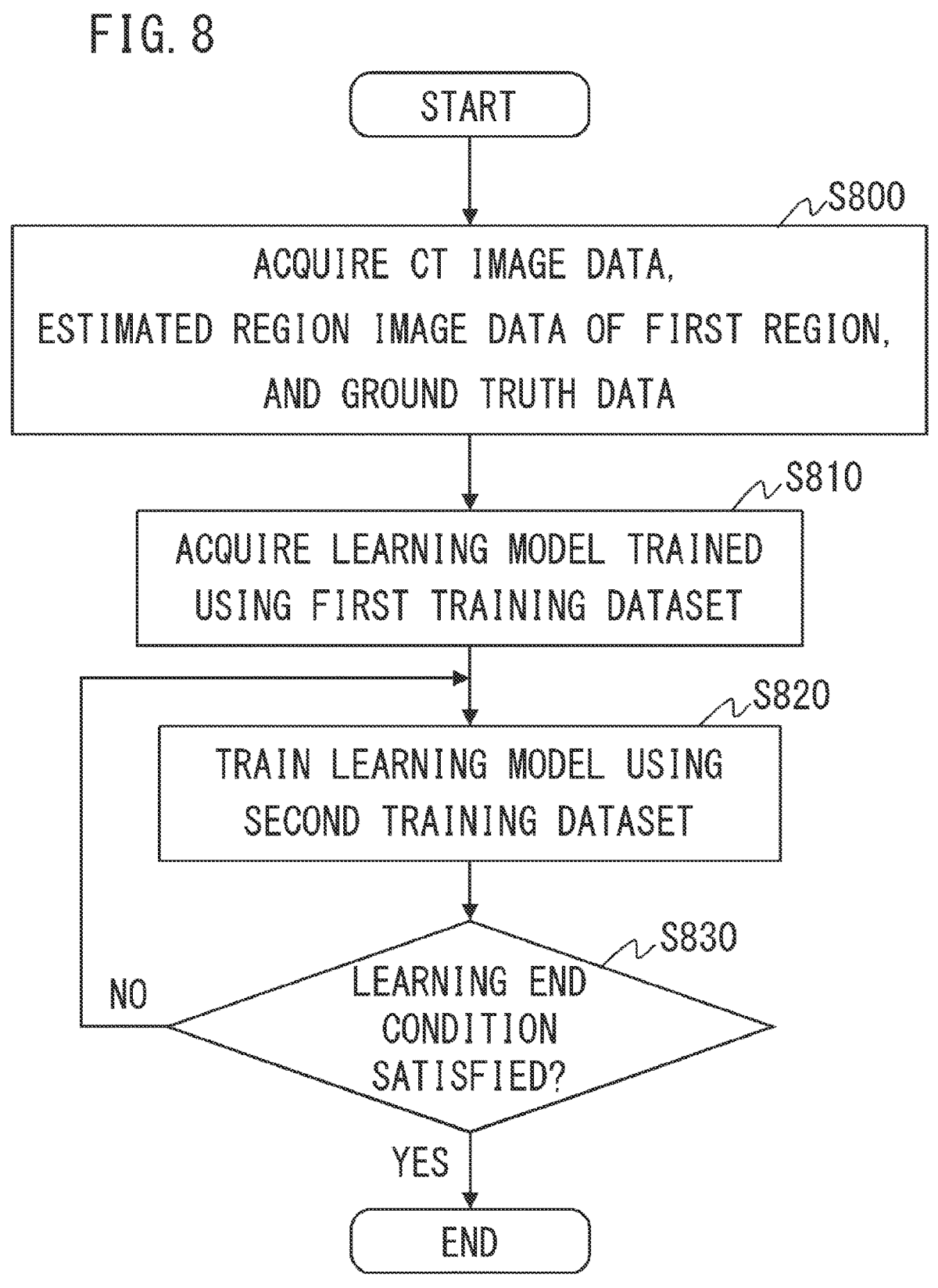

START

S800

ACQUIRE CT IMAGE DATA,
ESTIMATED REGION IMAGE DATA OF FIRST REGION,
AND GROUND TRUTH DATA

S810

ACQUIRE LEARNING MODEL TRAINED
USING FIRST TRAINING DATASET

S820

TRAIN LEARNING MODEL USING
SECOND TRAINING DATASET

S830

LEARNING END
CONDITION
SATISFIED?

NO

YES

END

INFORMATION PROCESSING APPARATUS, LEARNING METHOD, RECOGNITION METHOD, AND NON-TRANSITORY COMPUTER READABLE MEDIUM

BACKGROUND OF THE INVENTION

Field of the Invention

The present disclosure relates to an information processing apparatus, a learning method, a recognition method, and a non-transitory computer readable medium.

Description of the Related Art

In some cases of image recognition using machine learning, target image data and image data indicating a region of an object rendered in the target data may be inputted to a recognizer in order to recognize the target image data. For the image data indicating a region of an object rendered in the target image data, the recognition result acquired by another recognizer is often used.

Fengzu Liu, et al., "FusionNet: Incorporating Shape and Texture for Abnormality Detection in 3D Abdominal CT Scans", arXiv: 1908. 07654 [cs.CV], 2019 discloses a technique of learning to recognize a region of a pancreatic cancer by inputting, to a machine learning-based recognizer, CT image data (target image data) and image data indicating a region of the pancreas segmented by another recognizer.

SUMMARY OF THE INVENTION

In a case where the accuracy of a region segmented by another recognizer is low, the training of the recognizer based on the machine learning may not progress smoothly, and recognition accuracy by the recognizer may decrease.

The object of the disclosure in the present description is that in the training of the recognizer (learning model) based on machine learning, a technique to suppress a decrease in recognition accuracy caused by this recognizer is provided.

According to an aspect of the present disclosure, it is provided an information processing apparatus configured to input image data and region image data on a first region included in the image data, and train a learning model that performs predetermined recognition on the input image data, including at least one memory storing a program, and at least one processor which, by executing the program, causes the information processing apparatus to acquire learning image data, ground truth region image data which indicates a ground truth region of the first region included in the learning image data, and ground truth data on the recognition, acquire estimated region image data which indicates an estimated region of the first region in the learning image data, and train the learning model using a first training dataset constituted of the learning image data, the ground truth region image data and the ground truth data, and a second training dataset constituted of the learning image data, the estimated region image data and the ground truth data.

Further features of the present invention will become apparent from the following description of exemplary embodiments with reference to the attached drawings.

BRIEF DESCRIPTION OF THE DRAWINGS

FIG. 3 is a flow chart depicting an example of a processing procedure of the information processing apparatus according to Embodiment 1;

FIG. 8 is a flow chart depicting an example of a processing procedure of the information processing apparatus according to Embodiment 3.

DESCRIPTION OF THE EMBODIMENTS

Figure 1:
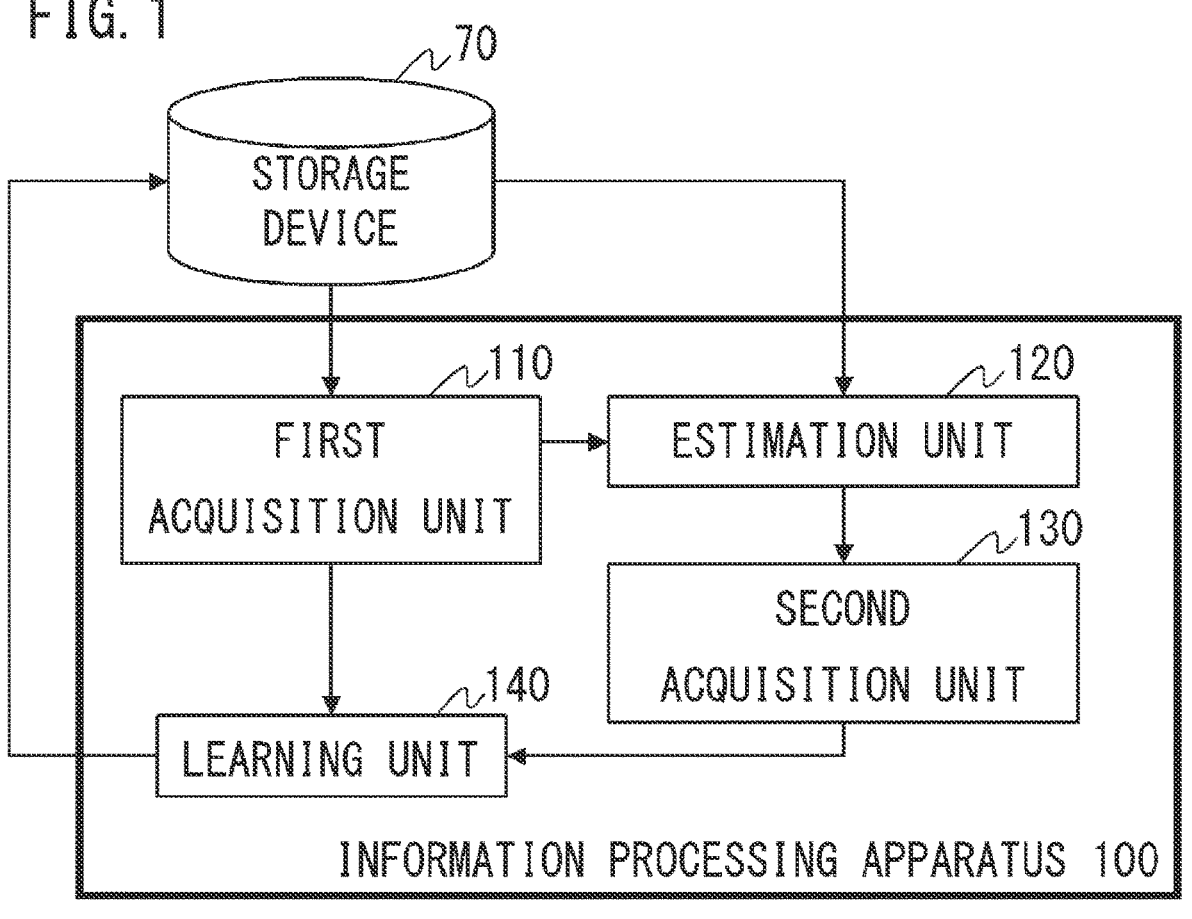
FIG. 1 is a diagram depicting an example of a functional configuration of an information processing apparatus according to Embodiment 1.

Embodiments of an information processing apparatus disclosed in the present description will be described with reference to the drawings. Identical or equivalent composing elements, members or processing steps indicated in each drawing are denoted with same reference signs, and redundant description thereof will be omitted. In each drawing, the composing elements, members or processing steps will be partially omitted.

In the following, the present invention will be described using an example of an abdominal tissue, which is rendered in abdominal CT image data captured by an X-ray computer tomographic imaging (X-ray CT) apparatus. However, the present invention is applicable not only to the abdominal tissue but also to all kinds of structure. The present invention is also applicable to tomographic images captured by a nuclear magnetic resonance imaging (MRI) apparatus, a positron emission tomographic imaging (PET) apparatus, or an ultrasonic imaging apparatus, or ordinary images captured by a camera. Further, the image to be inputted, to which the present invention is applied, may be a two-dimensional image or a three-dimensional image.

Furthermore, the present invention is applicable to an image capturing an ordinary object. The embodiments of the present invention are not limited to the embodiments described below.

Embodiment 1

(Overview) In Embodiment 1, a learning method for a learning model will be described, where abdominal CT image data, that is image data in which a target object is rendered, and region image data on a pancreas which is region image data of a first region, are inputted, and a region of a pancreatic tumor, which is a second region, is segmented. The learning model will be called a recognizer herein below.

In an information processing apparatus according to Embodiment 1, a recognizer is trained first using a first training dataset that includes: abdominal CT image data; ground truth region image data on a pancreas, which indicates a true region of the pancreas in the abdominal CT image data; and ground truth region image data on a pancreatic tumor, which indicates a true region of the pancreatic tumor. Then in the information processing apparatus, the recognizer is additionally trained using a second training dataset that includes: the abdominal CT image data; estimated region image data of the pancreas, which indicates a result of estimating a region of the pancreas in the abdominal CT image data; and the ground truth region image data on the pancreatic tumor. Here the abdominal CT image data, the ground truth region image data on the pancreas, the estimated region image data on the pancreas, and the ground truth region image data on the pancreatic tumor are examples of learning image data, ground truth region image data on a first region, estimated region image data on the first region, and ground truth data on the learning image data respectively.

In Embodiment 1, an example of using a convolutional neural network (CNN) as the recognizer will be described. The CNN according to Embodiment 1 segments a region of a target object from image data using U-Net, for example.

(Functional Configuration) The functional configuration of an information processing apparatus 100 according to Embodiment 1 will be described with reference to FIG. 1. As indicated in FIG. 1, the information processing apparatus 100 is constituted of a first acquisition unit 110, an estimation unit 120, a second acquisition unit 130 and a learning unit 140. The information processing apparatus 100 according to the present embodiment also has an external storage device 70.

The storage device 70 is an example of a computer-readable storage medium, and is a mass storage device, such as a hard disk drive (HDD) and a solid-state drive (SSD). The storage device 70 holds the abdominal CT image data, the ground truth region image data on the pancreas, and the ground truth region image data on the pancreatic tumor. The storage device 70 also holds the CNN which has been trained, so as to segment the region of the pancreas from the abdominal CT image data. In the following description, the CNN, which has been trained to segment the region of the pancreas from the abdominal CT image data, is called a "pancreas segmentation CNN". The pancreas segmentation CNN held in the storage device 70 may be data storing a layer structure and parameters (e.g. weight, bias) of the CNN, or may be data storing only the parameters.

The ground truth region image data is image data indicating the region of the target tissue rendered in the abdominal CT image, and is image data annotated by a physician or radiologist, for example. In the ground truth region image data, values of voxels included in the region of the target tissue are expressed by 1, and the values of the other voxels are expressed by 0, for example.

The storage device 70 may be configured as one function of the information processing apparatus 100.

The first acquisition unit 110 acquires, from the storage device 70: a plurality of abdominal CT image data; and a plurality of ground truth region image data of the pancreas and a plurality of ground truth region image data of the pancreatic tumor, which correspond to the plurality of abdominal CT image data respectively. Then the first acquisition unit 110 transmits the abdominal CT image data to the estimation unit 120, and transmits the abdominal CT image data, the ground truth region image data of the pancreas, and the ground truth region image data of the pancreatic tumor to the learning unit 140.

The estimation unit 120 receives the abdominal CT image data from the first acquisition unit 110, and acquires the pancreas segmentation CNN from the storage device 70. The estimation unit 120 constructs the CNN so that the CNN can perform estimation processing (described later) based on the data on the acquired pancreas segmentation CNN. Then the estimation unit 120 inputs the abdominal CT image data to the pancreas segmentation CNN, and generates the estimated region image data of the pancreas as the processing result.

The estimated region image data is image data indicating the region of the target tissue rendered in the abdominal CT image data. In the estimated region image data, values of voxels included in the region of the target tissue are expressed by 1, and values of the other voxels are expressed by 0, for example.

The second acquisition unit 130 acquires the estimated region image data of the pancreas from the estimation unit 120, and transmits the data to the learning unit 140.

The learning unit 140 receives, from the first acquisition unit 110: the plurality of abdominal CT image data; and the plurality of ground truth region image data of the pancreas and the plurality of ground truth region image data of the pancreatic tumor, which correspond to the plurality of abdominal CT image data respectively. The learning unit 140 also receives, from the second acquisition unit 130, the estimated region image data of the pancreas corresponding to the plurality of abdominal CT image data respectively. Then the learning unit 140 trains the recognizer using a first training dataset that includes: the plurality of abdominal CT image data; and the ground truth region image data of the pancreas and the ground truth region image data of the pancreatic tumor, which correspond to the plurality of abdominal CT image data respectively. This recognizer is a CNN, to which the abdominal CT image data and the region image data of the pancreas are inputted, and is trained so as to segment the region of the pancreatic tumor. In other words, the learning unit 140 trains the CNN using the abdominal CT image data, the region image data of the pancreas, and the region image data of the pancreatic tumor as one set of training data. Then the learning unit 140 additionally trains the CNN, which has been trained using the first training dataset, using a second training dataset that includes: the plurality of abdominal CT image data; and the estimated region image data of the pancreas and the ground truth region image data of the pancreatic tumor, which correspond to the plurality of abdominal CT image data respectively. The additional training refers to updating the parameters of the recognizer (CNN) again, using the parameters of the recognizer acquired by the training using the first training dataset as initial values. Here a part of the parameters may be fixed, and only the rest of the parameters may be updated. After finishing a series of leanings, the learning unit 140 stores the CNN which was trained using the second training dataset in the storage device 70. In the following description, the CNN, which is trained by the learning unit 140 to segment the region of the pancreatic tumor, is called a "pancreatic tumor segmentation CNN".

Figure 5A:
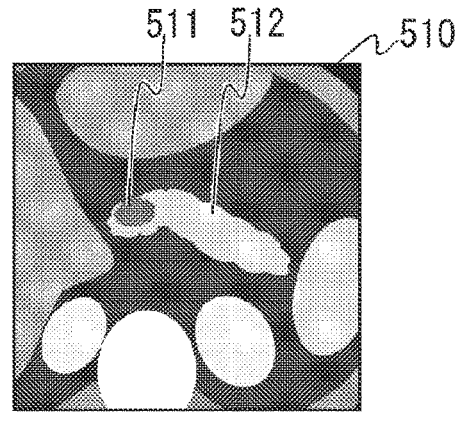
FIGS. 5A to 5D are diagrams for describing images according to Embodiment 1.
Figure 5B:
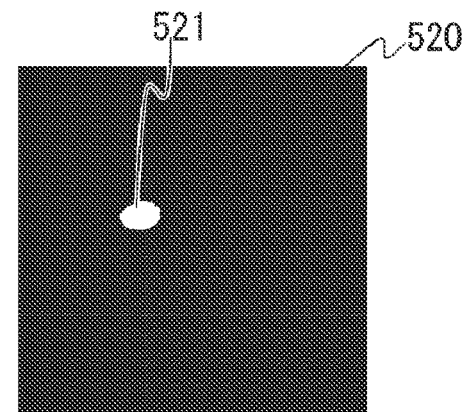
Figure 5C:
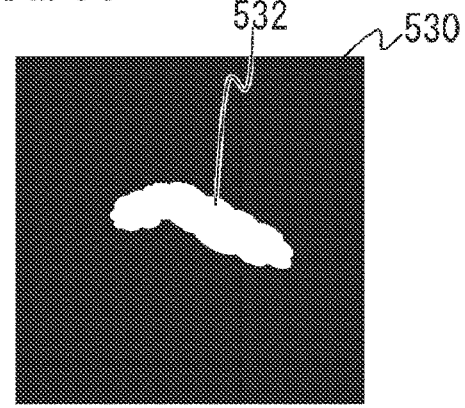
Figure 5D:
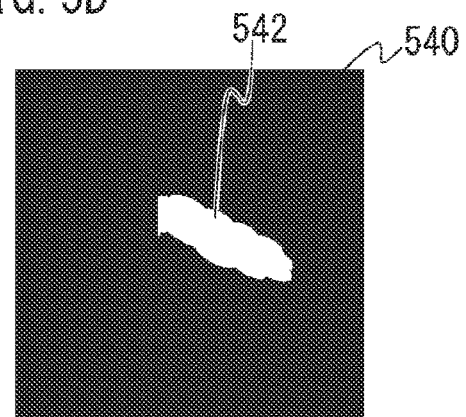

Now the image data according to Embodiment 1 will be described with reference to FIGS. 5A to 5D. FIG. 5A indicates abdominal CT image data 510. In Embodiment 1, the abdominal CT image data 510 is a three-dimensional image that is cropped such that the pancreas region 512 is included. In the abdominal CT image data 510, a pancreas region 512 and a pancreatic tumor region 511 have been rendered, for example. FIG. 5B indicates ground truth region image data 520 of the pancreatic tumor, and the ground truth region image data 520 indicates a ground truth region 521 of the pancreatic tumor, which is a true region of the pancreatic tumor in the abdominal CT image data 510. FIG. 5C indicates a ground truth region image data 530 of the pancreas in the abdominal CT image data 510. FIG. 5D indicates estimated region image data 540 of the pancreas generated by the estimation unit 120. The ground truth region image data 530 on the true pancreas and the estimated region image data 540 of the pancreas indicate the ground truth region 532 of the pancreas and the estimated region 542 of the pancreas respectively. The estimated region 542 of the pancreas is a result of estimating (segmenting) the region 512 of the pancreas in the abdominal CT image data 510. Here, in some cases, a ground truth region 532 of the pancreas and the estimated region 542 of the pancreas may not match, and a, difference may be generated therebetween. In the example of FIGS. 5A to 5D, a difference from the ground truth region 532 of the pancreas is generated in an area around the region 511 of the pancreatic tumor. In this way, if the recognizer is trained using only the second training dataset which includes an estimated region image data that is different from the region of the true pancreas region, errors in the estimated region image data of the pancreas may cause a negative influence, such as a delay in learning, and may decrease the accuracy of the recognizer. In the case of implementing completely automatic pancreatic cancer segmentation from the abdominal CT image data, on the other hand, the estimated region image data of the pancreas is inputted as the region image data of the pancreas when the pancreatic cancer segmentation CNN performs inference. Hence if the recognizer is trained using only the first training dataset that includes the ground truth region image data of the pancreas, accuracy of the recognizer may decrease due to the difference of the region image data during learning and the region image data during inference. Therefore in Embodiment 1, the features of the region image data of the pancreas are efficiently learned by the recognizer by using the first training dataset and the second training dataset, whereby a decrease in the accuracy of the recognizer is suppressed.

Figure 2:
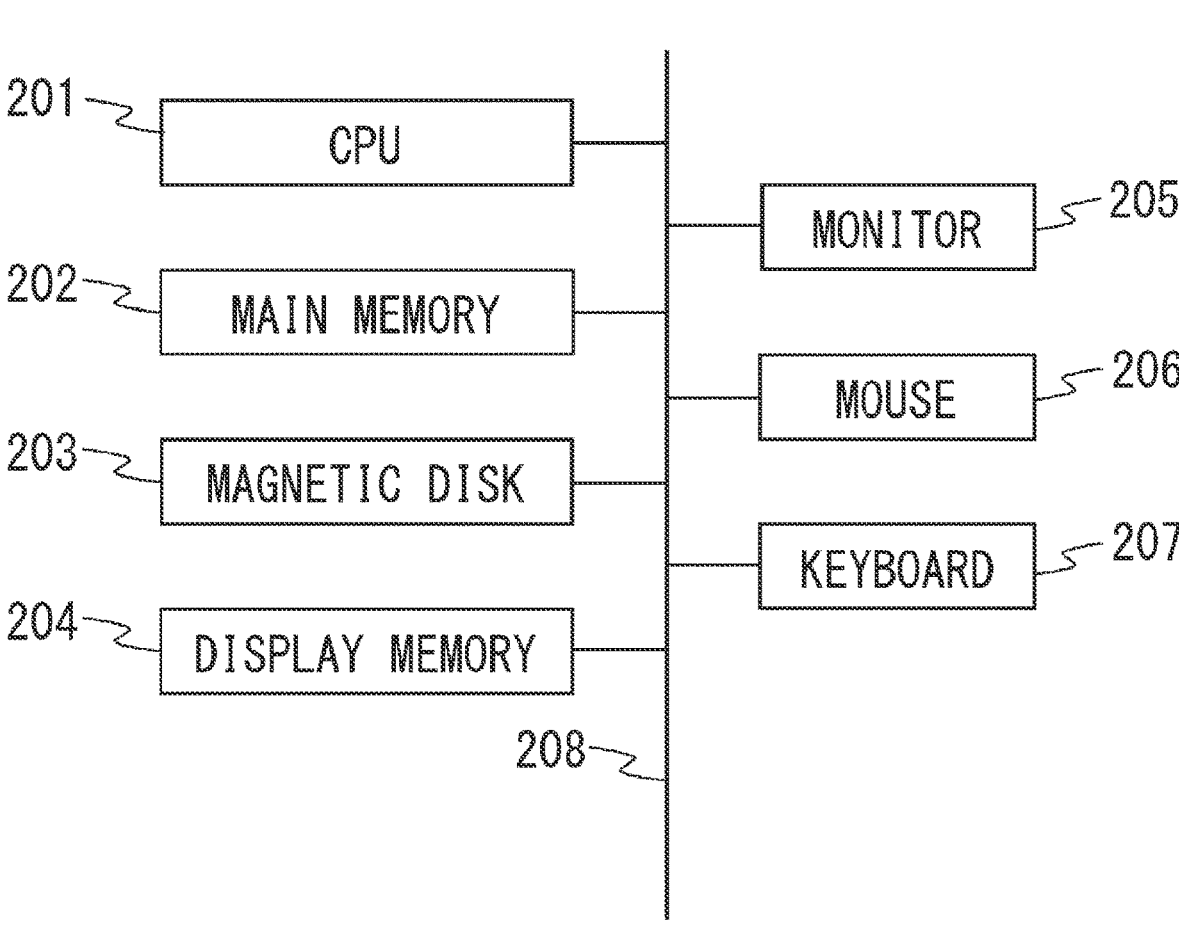
FIG. 2 is a diagram depicting an example of a hardware configuration of the information processing apparatus according to Embodiment 1.

(Hardware Configuration) Hardware configuration of the information processing apparatus 100 will be described next with reference to FIG. 2. The information processing apparatus 100 has a known configuration of a computer (information processing apparatus). As a hardware configuration, the information processing apparatus 100 includes a CPU 201, a main memory 202, a magnetic disk 203, a display memory 204, a monitor 205, a mouse 206 and a keyboard 207.

The central processing unit (CPU) 201 mainly controls operation of each composing element. The main memory 202 stores a control program that the CPU 201 executes, or provides a work area when the CPU 201 executes a program. The magnetic disk 203 stores an operating system (OS), device drivers for peripheral apparatuses, and programs to implement various application software, including a program for performing later mentioned processing, and the like. The CPU 201 executes the programs stored in the main memory 202, the magnetic disk 203 and the like, whereby the functions (software) of the information processing apparatus 100 indicated in FIG. 1 and processing in later mentioned flow charts are implemented.

The display memory 204 temporarily stores display data. The monitor 205 is a CRT monitor, a liquid crystal monitor, or the like, and displays images, text, and the like based on the data from the display memory 204. The mouse 206 and the keyboard 207 are used for the user to perform pointing input and character input respectively. Each of the composing elements is communicably interconnected via a common bus 208.

The CPU 201 corresponds to an example of a processor or a control unit. The information processing apparatus 100 may include at least one of a graphics processing unit (GPU)

and a field-programmable gate array (FPGA), in addition to the CPU 201. The information processing apparatus 100 may include at least one of the GPU and the FPGA, instead of the CPU 201. The main memory 202 and the magnetic disk 203 correspond to examples of the memory or the storage device.

(Processing Procedure) A processing procedure of the information processing apparatus 100 according to Embodiment 1 will be described with reference to FIG. 3.

(Step S300) In step S300, the first acquisition unit 110 acquires: a plurality of abdominal CT image data from the storage device 70; and a plurality of ground truth region image data of the pancreas and a plurality of ground truth region image data of the pancreatic tumor, which correspond to the plurality of abdominal CT image data respectively. Then the first acquisition unit 110 transmits the plurality of abdominal CT image data to the estimation unit 120, and transmits the plurality of abdominal CT image data, the plurality of ground truth region image data of the pancreas, and the plurality of ground truth region image data of the pancreatic tumor, to the learning unit 140.

(Step S310) In step S310, the estimation unit 120 acquires, from the storage device 70, the pancreas segmentation CNN which has been trained to segment the region of the pancreas from the abdominal CT image data. Then the estimation unit 120 inputs the abdominal CT image data, which was received from the first acquisition unit 110, to the pancreas segmentation CNN, so as to estimate the region of the pancreas rendered in the abdominal CT image data, and to generate the estimated region image data of the pancreas. Here the estimation unit 120 may execute post processing on the estimated region image data of the pancreas by using arbitrary image processing. The arbitrary image processing is processing to refine the segmented region of the pancreas, and may be binary processing, maximum connected component acquisition processing, morphology processing, graph cut segmentation processing, or the like, for example. The resolution conversion or the like may also be performed. Then the second acquisition unit 130 acquires the estimated region image data of the pancreas from the estimation unit 120, and transmits this data to the learning unit 140.

Figure 4:
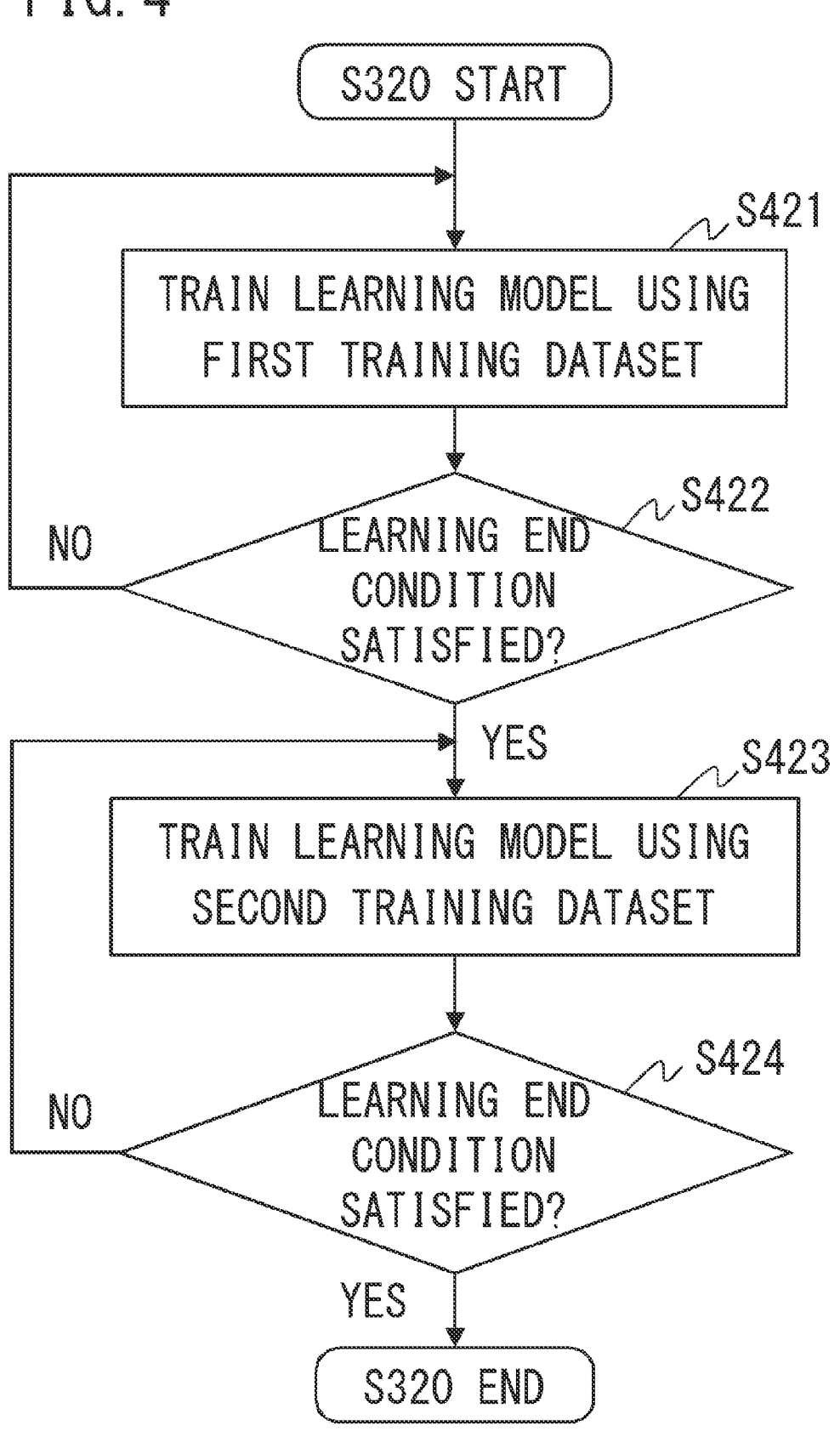
FIG. 4 is a flow chart depicting an example of a processing procedure of the information processing apparatus according to Embodiment 1.

(Step S320) In step S320, the learning unit 140 receives from the first acquisition unit 110: the plurality of abdominal CT image data; and the plurality of ground truth region image data of the pancreas and the plurality of ground truth region image data of the pancreatic tumor, which correspond to the plurality of abdominal CT image data respectively. The learning unit 140 also receives, from the second acquisition unit 130, the plurality of estimated region image data, which corresponds to the plurality of abdominal CT image data respectively. In Embodiment 1, a training dataset that includes the plurality of abdominal CT image data, the plurality of ground truth region image data of the pancreas, and the plurality of ground truth region image data of the pancreatic tumor is defined as a "first training dataset". Further, a training dataset that includes the plurality of abdominal CT image data, the plurality of estimated region image data of the pancreas, and the plurality of ground truth region image data of the pancreatic tumor is defined as a "second training dataset". The learning unit 140 trains the pancreatic tumor segmentation CNN using the first training dataset and the second training dataset, and stores the trained pancreatic tumor segmentation CNN in the storage device 70. In the following, the processing procedure in step S320 will be described in detail with reference to FIG. 4.

(Step S421) In step S421, the learning unit 140 executes the learning processing for the pancreatic tumor segmentation CNN using the first training dataset which includes the ground truth region image data of the pancreas, and updates the parameters of the CNN. The parameters of the CNN are typically the weight and bias of the kernel of a convolutional layer, and the offset and scale factors of a batch normalization layer. In Embodiment 1, the pancreatic tumor segmentation CNN receives input of the abdominal CT image data and the ground truth region image data of the pancreas that corresponds to this abdominal CT image data, and is trained so as to segment the region of the pancreatic tumor. Therefore the learning unit 140 regards the abdominal CT image data, the ground truth region image data of the pancreas, and the ground truth region image data of the pancreatic tumor as one set of training data, and updates the parameters of the pancreatic tumor segmentation CNN.

In this step, a plurality of training data (batch) are selected from the first training dataset using such a known method as the error back propagation method, and the parameters of the pancreatic tumor segmentation CNN are updated thereby. Here for the loss function, a known function, such as the mean squared error (MSE) and the dice coefficient loss, may be used. For the optimization method as well, a known method, such as the stochastic gradient descent (SGD) method and the Adam method, may be used. For such hyper-parameters as the learning rate and the batch size as well, appropriate values may be set.

(Step S422) In step S422, the learning unit 140 determines whether or not the learning end condition to end the learning of the pancreatic tumor segmentation CNN using the first training dataset is satisfied, and determines the next step. The learning end condition is typically that a number of epochs that elapsed since the start of the learning reached a predetermined number, or that a value of the loss function reached a predetermined value, but is not limited thereto. For example, the learning end condition may be that an accuracy of a dataset (verification dataset), which is different from the first training dataset, has reached a predetermined value. A plurality of end conditions may be combined. In Embodiment 1, the learning end condition is that a number of epochs, elapsed since the start of the learning, reached an upper limit value of the number of epochs which was set in advance (maximum number of epochs). The learning unit 140 advances to step S423 if the learning end condition is satisfied, or returns to step S421 if not.

(Step S423) In step S423, for the pancreatic tumor segmentation CNN which was trained using the first training dataset, the learning unit 140 executes additional learning processing using the second training dataset, that includes the estimated region image data of the pancreas. This learning processing is executed using a known method, just like step S421. Here the hyper-parameters, such as the loss function, the optimization method, the learning rate and batch size, may be the same as those used for training the pancreatic tumor segmentation CNN using the first training dataset, or may be partially different.

(Step S424) In step S424, the learning unit 140 determines whether or not the learning end condition, to end the learning of the pancreatic tumor segmentation CNN using the second training dataset, is satisfied, whereby the next step is determined. For the learning end condition, a known condition, such as those examples in step S422, may be used. The end condition used here may be the same as or different from step S422. The learning unit 140 stores the pancreatic tumor segmentation CNN which learned by the above learning processing in the storage device 70 and ends step S320 if the learning end condition is satisfied, or returns to step S423 if not.

By the above mentioned learning method, the abdominal CT image data and the region image data of the pancreas included in this abdominal CT image are inputted, and the pancreatic tumor segmentation CNN, to segment the region of the pancreatic tumor, is generated. The pancreatic tumor segmentation CNN (recognizer), which was trained like this, can be used for recognition processing (inference processing). As an example of the recognition processing, a method for segmenting a region of the pancreatic tumor and generating the estimated region image data of the pancreatic tumor, using the recognition unit (not illustrated in FIG. 1) will be described. First the recognition unit of the information processing apparatus 100 acquires the pancreas segmentation CNN from the storage device 70. Then the recognition unit receives the abdominal CT image data, which is the recognition target, from the first acquisition unit 110, and receives the region image data of the pancreas, which is included in the abdominal CT image data, from the second acquisition unit 130. Then the recognition unit inputs this abdominal CT image data and the region image data of the pancreas to the pancreatic tumor segmentation CNN, and segments the region of the pancreatic tumor. Then the recognition unit generates the estimated region image data of the pancreatic tumor as the result of segmenting the region of the pancreatic tumor, and stores this data in the storage device 70. The recognition unit may be integrated in the information processing apparatus 100, or may be implemented as a function of a different apparatus.

(Technical Effect) As described above, the information processing apparatus 100 according to Embodiment 1 trains the recognizer using the first training dataset that includes the ground truth region image data of the pancreas, and additionally trains this recognizer using the second training dataset that includes the estimated region image data of the pancreas. By training in steps like this, the features in the region image data of the pancreas can be efficiently learned, even if an error exists in the region of the pancreas held in the estimated region image data of the pancreas. Therefore a decrease in the accuracy of the pancreatic tumor segmentation CNN can be suppressed.

(Variations) In the above description, the pancreas and the pancreatic tumor in the abdominal CT image data were described as an example, but the present invention is applicable to an arbitrary object in an arbitrary image data. In other words, the present invention is applicable to medical image data other than CT, and to image data captured by a camera.

In the image recognition task of the example described above, the target image data (abdominal CT image data) and the region image data of the first region (pancreas) are inputted, and the second region (pancreatic tumor) is segmented, but the applicable image recognition task is not limited thereto. For example, an image of the target image data may be classified, or a class of the first region or the second region may be classified. In this case, the information processing apparatus acquires a label corresponding to a classification target (data indicating a class to which the target image data, the first region or the second region belongs) as the ground truth data which corresponds to the target image data and the ground truth region image data of the first region, and trains the recognizer. The image recognition task, to specify the position of the first region or the second region, may also be used. In the case of segmenting the first region or the second region, as the ground truth data corresponding to the target image data and the ground truth region image data of the first region, the information processing apparatus acquires the ground truth region image data corresponding to the classification target region (the first region or the second region), and trains the recognizer. In the case of bounding box detection or landmark detection, the information processing apparatus acquires the ground truth coordinate data corresponding to the classification target (the first region or the second region as the ground truth data), and trains the recognizer. The present invention is applicable to any other image recognition task as long as it is configured to input the target image data and the region image data of the first region. A plurality of first regions or second regions may exist.

In the above description, the estimation unit 120 is configured as one function of the information processing apparatus 100, but may be configured as one function of an external device. In this case, in step S310, the information processing apparatus 100 acquires the estimated region image data of the pancreas, using the second acquisition unit 130, from an external device having the function of the estimation unit 120, or from an external device in which the estimated region image data of the pancreas is stored.

In the above description, the ground truth region image data and the estimated region image data are binary image data in which the voxel value is expressed by 0 or 1, but this expression is an example, and an arbitrary form that can express the region of the target tissue may be used. For example, image data in which the region likelihood of the target tissue is expressed by continuous values, or image data in which a plurality of target tissues are expressed by multiple values, may be used. The expression form of the ground truth region image data and that of the estimated region image data may be the same or may be different from each other.

In the above description, the deep learning based-recognizer, such as CNN, is used as an example, but a recognizer is not limited to this. For example, a classification tree, such as the Support Vector Machine (SVM) and the Random Forest, may be used as the recognizer. In this case, an appropriate method is used for the learning method depending on the recognizer. The method used by the recognizer in the estimation unit 120 is not limited to the method based on the above mentioned machine learning, but may be any method based on the image processing. For example, a method based on alignment with an organ presence probability atlas, or a method based on the threshold processing, may be used.

In the example described above, the data annotated by a physician or radiologist is used as the ground truth region image data, but the ground truth region image data is not limited thereto, and arbitrary data, of which reliability is higher than the estimated region image data, can be used. For example, the ground truth region image data may be generated by a first recognizer which is expected to estimate a region at high precision, and the estimated region image data may be generated by a second recognizer which performs a simpler calculation compared with the first recognizer. Thereby the effect disclosed in the present description can be implemented without the region image data annotated by a physician or the like. In some cases, when a series of inferences is performed, from segmentation of the region of the pancreas to segmentation of the region of a pancreatic tumor, using a recognizer which is expected to estimate a region at high precision, is difficult due to calculation cost (calculation time, calculation resource) constraints. In such a case, applying the learning method disclosed in the present description can reduce the negative influence due to the low accuracy of the region image data generated by a simple recognizer.

In the example described above, the same abdominal CT image data is used for the input to the pancreas segmentation CNN in the estimation unit 120, and for the input to the pancreatic tumor segmentation CNN in the learning unit 140, but different image data may be used. For example, different smoothing filters may be used for each input, or a smoothing filter may be used for only one of the inputs. Further, different abdominal CT image data, of which resolutions are different from each other, may be used for the inputs respectively. Furthermore, image data, of which aligned contrast imaging states are different from each other, may be used for the inputs respectively, or image data having different modalities from each other may be used.

Embodiment 2

(Overview) In Embodiment 1, the recognizer (learning model) is trained in steps using the first training dataset which includes the ground truth region image data of the pancreas, and the second training dataset which includes the estimated region image data of the pancreas. In Embodiment 2, a method for constructing a third training dataset based on the first training dataset and the second training dataset, training the recognizer using the third training dataset, will be described. Here when a predetermined condition is satisfied, the information processing apparatus according to Embodiment 2 constructs the third training dataset while changing the ratio between the training data included in the first training dataset, and the training data included in the second training dataset. Specifically, when an epoch, which is a step of each learning, is started (an example of the predetermined condition), the third training dataset is constructed so that a number of training data to be sampled from the first training dataset is gradually decreased in accordance with a number of times of epochs (a number of epochs) from the start of the learning. In other words, the third training dataset is constructed so that the ratio of the training data included in the second training dataset in the third training dataset increases as the number of epochs increases.

(Functional Configuration) The configuration of the information processing apparatus according to Embodiment 2 is the same as the information processing apparatus 100 according to Embodiment 1. In the following, the functional configuration of the information processing apparatus according to Embodiment 2 will be described with reference to FIG. 1, omitting the redundant portions of the description of the information processing apparatus according to Embodiment 1. The storage device 70, the first acquisition unit 110, the estimation unit 120, and the second acquisition unit 130 are the same as Embodiment 1, hence description thereof is omitted.

Just like Embodiment 1, the learning unit 140 receives: a plurality of abdominal CT image data; and a plurality of ground truth region image data of the pancreas, a plurality of ground truth region image data of the pancreatic tumor, and a plurality of estimated region image data of the pancreas, which correspond to the plurality of abdominal CT image data respectively. Then the learning unit 140 constructs the third training dataset based on the first training dataset that includes the ground truth region image data of the pancreas, and the second training dataset that includes the estimated region image data of the pancreas, and executes the learning processing for the pancreatic tumor segmentation CNN. In Embodiment 2, the learning unit 140 constructs the third training dataset at the start of the epoch, so that the number of training datasets which are sampled from the first training dataset gradually decreases in according with the number of epochs. When a series of leanings ends, the learning unit 140 stores the trained pancreatic tumor segmentation CNN in the storage device 70.

(Hardware Configuration) The hardware configuration of the information processing apparatus 100 according to Embodiment 2 is the same as Embodiment 1, hence description thereof is omitted.

(Processing Procedure) Next the processing procedure of the information processing apparatus 100 according to Embodiment 2 will be described with reference to FIG. 3. In the following, description of redundant portions of the description of the information processing apparatus 100 according to Embodiment 1 is omitted.

(Steps S300, S310) Steps S300 and S310 are the same as steps S300 and S310 of Embodiment 1, hence description thereof is omitted.

Figure 6:
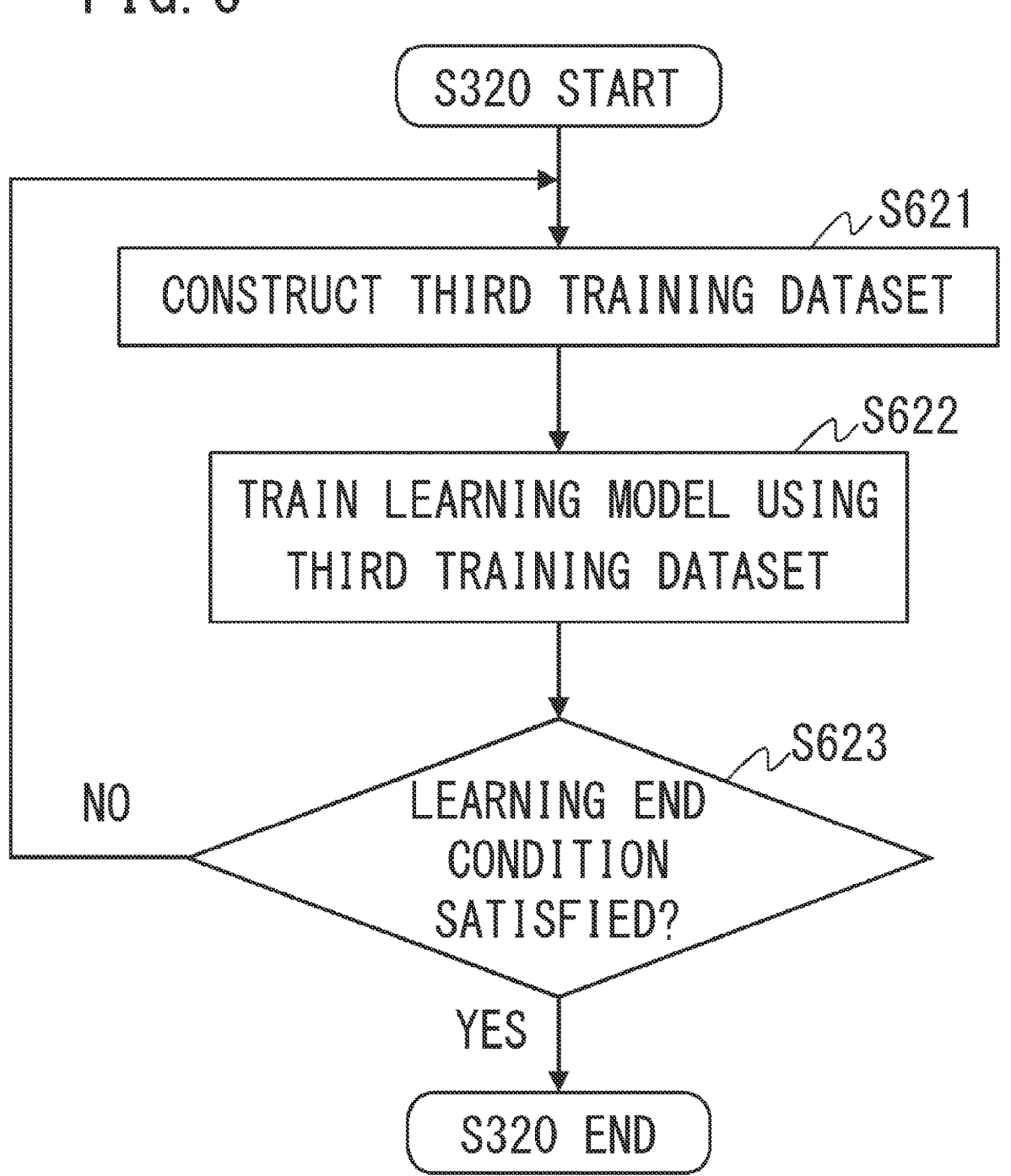
FIG. 6 is a flow chart depicting an example of a processing procedure of an information processing apparatus according to Embodiment 2.

(Step S320) In step S320, the learning unit 140 receives, from the first acquisition unit 110: a plurality of abdominal CT image data; and a plurality of ground truth region image data of the pancreas and a plurality of ground truth region image data of the pancreas of the pancreatic tumor, which correspond to the plurality of abdominal CT image data respectively. Further, the learning unit 140 receives, from the second acquisition unit 130, a plurality of estimated region image data of the pancreas, which correspond to the plurality of abdominal CT image data respectively. In Embodiment 2, just like Embodiment 1, a training dataset that includes the plurality of abdominal CT image data, the plurality of ground truth region image data of the pancreas, and the plurality of ground truth region image data of the pancreatic tumor is defined as a "first training dataset". Further, a training dataset that includes the plurality of abdominal CT image data, the plurality of estimated region image data of the pancreas, and the plurality of ground truth region image data of the pancreatic tumor is defined as a "second training dataset". Based on the first training dataset and the second training dataset, the learning unit 140 constructs a third training dataset. Then while sequentially updating the third training dataset, the learning unit 140 trains the pancreatic tumor segmentation CNN, and stores the trained pancreatic tumor segmentation CNN in the storage device 70. The processing procedure in step S320 will be described with reference to FIG. 6.

(Step S621) In step S621, the learning unit 140 constructs the third training dataset based on the first training dataset which includes the ground truth region image data of the pancreas, and the second training dataset which includes the estimated region image data of the pancreas. In Embodiment 2, when an epoch is started, the third training dataset is constructed so that a number of training data included in the first training dataset gradually decreases in the third training dataset in accordance with the number of epochs from the start of the learning. For example, when a total number of training data included in the first training dataset is $m_1$, a number of training data $m_1'$, which are sampled from the first training dataset upon constructing the third training dataset, is determined by the following formula.

$$m_1' = m_1 \times (1 - n_{current}/n_{maximum})$$

Here $n_{current}$ indicates a number of epochs from the start of the learning, and $n_{maximum}$ indicates an upper limit number of epochs. The upper limit number of epochs is an example of the learning end condition in step S623, which will be described later. In other words, as a number of epochs increases, a number of training data that is sampled from the first training dataset gradually decreases, and becomes $m_1' = 0$ in the final epoch (epoch when the number of epochs reached the upper limit). On the other hand, the number of training data selected from the second training dataset, when constructing the third training dataset, is not changed, regardless the number of epochs. In other words, when the total number of training data included in the second training dataset is $m_2$, the number of training data sampled from the second training data when constructing the third training dataset, is always set to $m_2' = m_2$. Thereby the ratio of the training data included in the first training dataset and included the second training dataset constituting the third training dataset, is $m_1 \times (1 - n_{current}/n_{maximum}):m_2$. In this way, the third training dataset is constructed while changing the ratio of the training data included in the first training dataset and the training data included in the second training dataset when an epoch is started (an example of a predetermined condition).

(Step S622) In step S622, the learning unit 140 executes the learning processing for the pancreatic tumor segmentation CNN using the third training dataset, and updates the parameters of the CNN. The learning processing is executed using a known method, just like step S421 of Embodiment 1. Here it is assumed that the hyper-parameters, such as the loss function, the optimization method, the learning rate and the batch size, are arbitrarily set to appropriate values.

(Step S623) In step S623, the learning unit 140 determines whether or not the learning end condition to end the learning of the pancreatic tumor segmentation CNN using the third training dataset is satisfied, and determines the next step. For the learning end condition, known conditions, such as the examples indicated in step S422 of Embodiment 1, may be used. The learning unit 140 stores the pancreatic tumor segmentation CNN trained by the above learning processing in the storage device 70 and ends step S320 if the learning end condition is satisfied, or returns to step S621 if not.

(Technical Effect) As described above, the information processing apparatus 100 according to Embodiment 2 constructs the third training dataset based on the first training dataset which includes the ground truth region image data of the pancreas, and the second training dataset which includes the estimated region image data of the pancreas, and trains the recognizer. By training the recognizer like this, the features in the region image data of the pancreas can be efficiently learned, even if an error exists in the region of the pancreas held in the estimated region image data of the pancreas. Therefore a decrease in the accuracy of the pancreatic tumor segmentation CNN can be suppressed.

(Variations) In the example described above, the ratio of the training data included in the first training dataset and the training data included in the second training dataset is changed when an epoch (step of each learning) is started, but the present invention is not limited thereto. For example, the ratio may be changed on the condition that a predetermined stage in the epoch (e.g. start or end of an epoch) in the learning is reached, or the ratio may be changed on the condition that the evaluation index (e.g. loss function, other indices) of the learning reaches a predetermined value. For example, in the case where the predetermined condition is that the value of the loss function reaches a predetermined value, the third training dataset is constructed so as to become $m_1':m_2' = 1:1$ when the learning starts, $m_1':m_2' = 1:2$ when a first predetermined value is reached, and $m_1':m_2' = 1:3$ when a second predetermined value is reached. Further, in the above description, when the third training dataset is constructed, the ratio between the number of training data included in the first training dataset and the number of training data included in the second training dataset is changed by gradually decreasing a number of training data sampled from the first training dataset, but the present invention is not limited thereto. For example, the number of training data sampled from the first training dataset may be fixed to a predetermined number, and the number of training data sampled from the second training dataset may be gradually increased in accordance with a number of epochs from the start of learning. The number of training data from the first training dataset or the second training dataset need not increase/decrease monotonically, but a number of training data sampled may be increased or decreased in the middle of learning. Besides the above mentioned methods, other methods may be used to change the condition to contrast the third training dataset and the ratio of the training data included in the first training dataset and that included in the second training dataset, so that the ratio is changed in the middle of the learning.

In the above description, the ratio of the number of training data included in the first training dataset and that included in the second training dataset constituting the third training dataset is changed when a predetermined condition is satisfied, but a change in the ratio is not always necessary. In other words, in the series of learning processing, the third training dataset may be constructed using all the training data included in the first training dataset and the second training dataset respectively. Further, the third training dataset may also be constructed by randomly sampling the training data from each dataset at a predetermined ratio.

Embodiment 3

(Overview) In Embodiment 1, a method of training the pancreatic tumor segmentation CNN to perform learning using the first training dataset that includes the ground truth region image data of the pancreas, and additionally training the pancreatic tumor segmentation CNN using the second training dataset that includes the estimated region image data of the pancreas, was described. In Embodiment 3, a method of acquiring a pancreatic tumor segmentation CNN, which was trained using the first training dataset that includes the ground truth region image data of the pancreas, from the outside, and additionally training this pancreatic tumor segmentation CNN using the second training dataset, will be described as another example.

Figure 7:
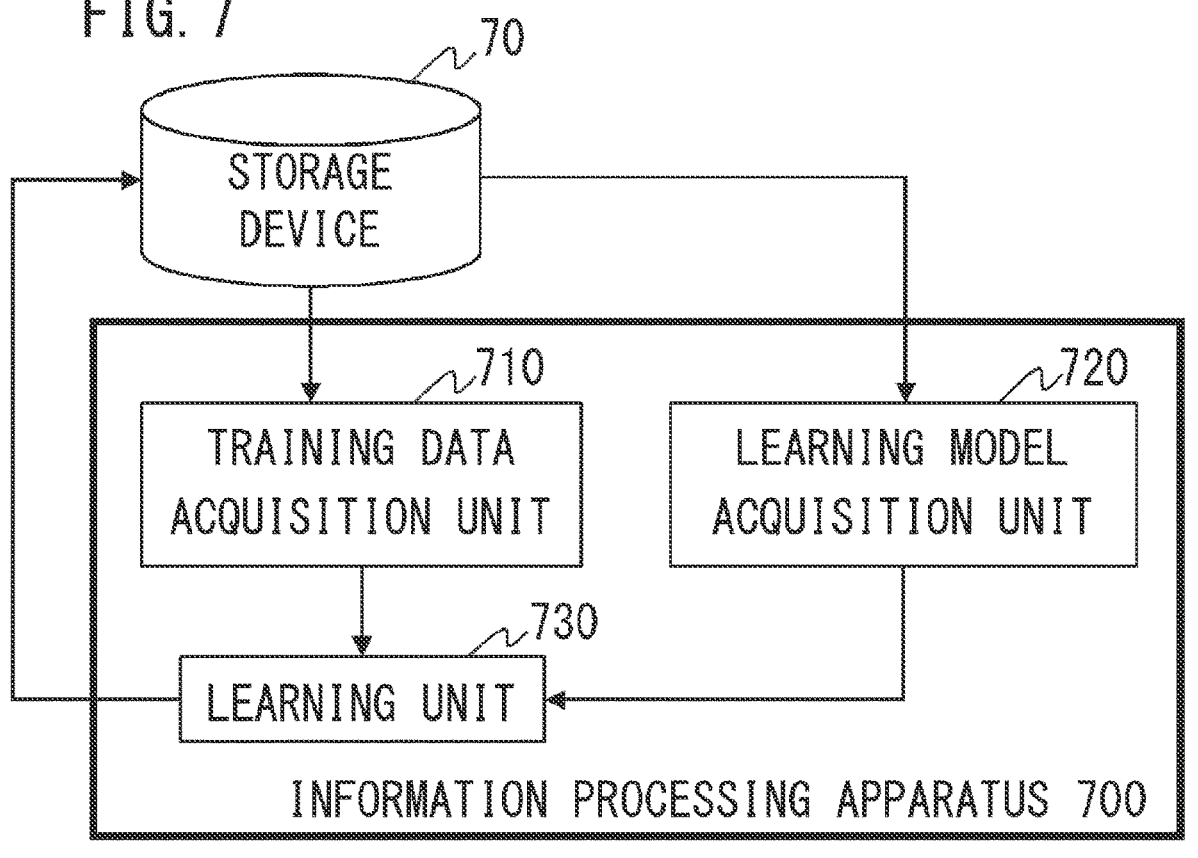
FIG. 7 is a diagram depicting an example of a functional configuration of an information processing apparatus according to Embodiment 3.

(Functional Configuration) Next a functional configuration of an information processing apparatus 700 according to Embodiment 3 will be described with reference to FIG. 7. As indicated in FIG. 7, the information processing apparatus 700 is constituted of a training data acquisition unit 710, a learning model acquisition unit 720 and a learning unit 730. The information processing apparatus 700 according to Embodiment 3 also has an external storage device 70.

The storage device 70 holds abdominal CT image data, estimated region image data of the pancreas, and ground truth region image data of the pancreatic tumor. The storage device 70 also holds the pancreatic tumor segmentation CNN that was trained using a first training dataset which includes the abdominal CT image data, the ground truth region image data of the pancreas, and the ground truth region image data of the pancreatic tumor.

The training data acquisition unit 710 acquires from the storage device 70: a plurality of abdominal CT image data; and a plurality of estimated region image data of the pancreas and a plurality of ground truth region image data of the pancreatic tumor which correspond to the plurality of abdominal CT image data respectively, and transmits this data to the learning unit 730.

The learning model acquisition unit 720 acquires from the storage device 70 the pancreatic tumor segmentation CNN that was trained using the first training dataset which includes the ground truth region image data of the pancreas, and transmits this pancreatic tumor segmentation CNN to the learning unit 730.

From the training data acquisition unit 710, the learning unit 730 receives: the plurality of abdominal CT image data, and the plurality of estimated region image data of the pancreas and the plurality of ground truth region image data of the pancreatic tumor, which correspond to the plurality of abdominal CT image data respectively. The set of these image data is called a "second training dataset". Further, from the learning model acquisition unit 720, the learning unit 730 acquires the pancreatic tumor segmentation CNN that was learned using the first training dataset. Then using the second training dataset that includes the estimated region image data of the pancreas, the learning unit 730 additionally trains the pancreas segmentation CNN trained by the first training dataset. Then when the learning processing ends, the learning unit 730 stores the pancreatic tumor segmentation CNN, which was trained using the second training dataset in the storage device 70.

(Hardware Configuration) The hardware configuration of the information processing apparatus 700 according to Embodiment 3 is the same as Embodiment 1, hence description thereof is omitted.

(Processing Procedure) A processing procedure of the information processing apparatus 700 according to Embodiment 3 will be described with reference to FIG. 8.

(Step S800) In step S800, the training data acquisition unit 710 acquires from the storage device 70: a plurality of abdominal CT image data; a plurality of estimated region image data of the pancreas; and a plurality of ground truth region image data of the pancreatic tumor, and transmits these data to the learning unit 730.

(Step S810) In step S810, from the storage device 70, the learning model acquisition unit 720 acquires the pancreatic tumor segmentation CNN that was trained using the first training dataset that includes the ground truth region image data of the pancreas, and transmits the pancreatic tumor segmentation CNN to the learning unit 730.

(Step S820) In step S820, the learning unit 730 receives from the training data acquisition unit 710: a plurality of abdominal CT image data; and a plurality of estimated region image data of the pancreas, and a plurality of ground truth region image data of the pancreatic tumor, which correspond to the plurality of abdominal CT image data respectively. The set of these image data is called a "second training dataset". Further, from the learning model acquisition unit 720, the learning unit 730 acquires the pancreatic tumor segmentation CNN that was trained using the first training dataset. Then using the second training dataset that includes: the plurality of abdominal CT image data; and the plurality of estimated region image data of the pancreas, and the plurality of ground truth region image data of the pancreas tumor, which correspond to the plurality of abdominal CT images, the learning unit 730 additionally trains the pancreatic tumor segmentation CNN. The learning processing is executed using a known method, just like step S421 of Embodiment 1. Here the hyper-parameters, such as the loss function, the optimization method, the learning rate, and the batch size, may be set to appropriate values.

(Step S830) In step S830, the learning unit 730 determines whether or not the learning end condition to end the learning of the pancreatic tumor segmentation CNN using the second training dataset is satisfied, and determines the next step. For the learning end condition, known conditions, such as the examples indicated in step S422 of Embodiment 1, may be used. The learning unit 730 stores the pancreatic tumor segmentation CNN, which was trained by the above learning processing, in the storage device 70, and ends the series of processing if the learning end condition is satisfied, or returns to step S820 if not.

(Technical Effect) As described above, using the second training dataset that includes the estimated region image data of the pancreas, the information processing apparatus 700 according to Embodiment 3 additionally trains the recognizer, which was trained using the first training dataset which includes the ground truth region image data of the pancreas. By training like this, the features in the region image data of the pancreas can be efficiently learned, even if an error exists in the region of the pancreas held in the estimated region image data of the pancreas. Therefore a decrease in the accuracy of the pancreatic tumor segmentation CNN can be suppressed.

According to the disclosure of the present description, a decrease in the recognition accuracy of the recognizer can be suppressed in the training of the recognizer (learning model), based on the machine learning.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-035944, filed on Mar. 9, 2022, which is hereby incorporated by reference herein in its entirety.

What is claimed is:

1. An information processing apparatus configured to input image data and region image data on a first region included in the image data, and train a learning model that performs predetermined recognition on the input image data, comprising:

at least one memory storing a program; and at least one processor which, by executing the program, causes the information processing apparatus to:

acquire learning image data, ground truth region image data which indicates a ground truth region of the first region included in the learning image data, and ground truth data on the recognition;

acquire estimated region image data which indicates an estimated region of the first region in the learning image data;

train the learning model using a first training dataset including the learning image data to be input to the learning model, the ground truth region image data to be input to the learning model and the ground truth data on the recognition; and further train the learning model, which has been trained using the first training dataset, using a second training dataset including the learning image data to be input to the learning model, the estimated region image data to be input to the learning model and the ground truth data on the recognition.

2. The information processing apparatus according to claim 1, wherein the ground truth data is data indicating a class to which the learning image data belongs, a class to which the first region belongs, or a class to which a second region in the learning image data belongs.

3. The information processing apparatus according to claim 1, wherein the ground truth data is the ground truth region image data of the first region, or ground truth region image data of a second region in the learning image data.

4. The information processing apparatus according to claim 1, wherein the ground truth data is ground truth coordinate data which indicates a position related to the first region, or ground truth coordinate data which indicates a position related to a second region.

5. The information processing apparatus according to claim 1, wherein the at least one processor further causes the information processing apparatus to estimate the first region in the learning image data, and acquire the estimated region image data on the first region based on the estimation.

6. The information processing apparatus according to claim 5, wherein the at least one processor causes the information processing apparatus to input the image data, and generate the estimated region image data which indicates the estimated region of the first region included in the input image data.

7. The information processing apparatus according to claim 1, wherein the at least one processor causes the information processing apparatus to construct a third training dataset from training data included in the first training dataset and training data included in the second training dataset, and train the learning model using the third training dataset.

8. The information processing apparatus according to claim 7, wherein the at least one processor causes the information processing apparatus to construct the third training dataset, in a case of satisfying a predetermined condition, by changing the ratio of a number of training data included in the first training dataset and a number of training data included in the second training dataset.

9. The information processing apparatus according to claim 8, wherein the predetermined condition is that a predetermined stage in learning is reached or an evaluation index of learning reaches a predetermined value.

10. The information processing apparatus according to claim 1, wherein the at least one processor further causes the information processing apparatus to perform predetermined recognition processing on target image data using a learned model trained by learning processing performed by the information processing apparatus.

11. The information processing apparatus according to claim 1, wherein the first region corresponds to a region indicating a pancreas in the learning image.

12. A learning method for a learning model to which image data and region image data on a first region included in the image data are inputted so as to perform predetermined recognition on the input image data comprising:

a first acquisition step of acquiring learning image data, ground truth region image data which indicates a ground truth region of the first region included in the learning image data, and ground truth data on the recognition, a second acquisition step of acquiring estimated region image data which indicates an estimated region of the first region in the learning image data;

a learning step of training the learning model using a first training dataset including the learning image data to be input to the learning model, the ground truth region image data to be input to the learning model, and the ground truth data on the recognition; and further train the learning model, which has been trained using the first training dataset, using a second training dataset including the learning image data to be input to the learning model, the estimated region image data to be input to the learning model and the ground truth data on the recognition.

13. A recognition method for performing predetermined recognition processing, comprising:

an acquisition step of acquiring data on a recognition target; and a recognition step of performing predetermined recognition processing on the recognition target data using a learned model trained by the learning method according to claim 12.

14. A non-transitory computer readable medium storing a program to execute the recognition method according to claim 13 by a computer.

15. A non-transitory computer readable medium storing a program to execute the learning method according to claim 12 by a computer.

16. A learning method for a learning model to which image data and region image data on a first region included in the image data are inputted so as to perform predetermined recognition on the input image data comprising:

a first acquisition step of acquiring learning image data, ground truth region image data which indicates a ground truth region of the first region included in the learning image data, and ground truth data on the recognition, a second acquisition step of acquiring estimated region image data which indicates an estimated region of the first region in the learning image data; and a learning step of training the learning model using a first training dataset constituted of the learning image data, the ground truth region image data, and the ground truth data, and a second training dataset constituted of the learning image data, the estimated region image data and the ground truth data, wherein, in the learning step, a third training dataset is constructed from training data included in the first training dataset and training data included in the second training dataset, and the learning model is trained using the third training dataset, and wherein the third training dataset is, in a case of satisfying a predetermined condition, constructed by changing the ratio of a number of training data included in the first training dataset and a number of training data included in the second training dataset.

* * * * *